United States Patent
Otterlee et al.

(10) Patent No.: US 7,300,062 B2
(45) Date of Patent: Nov. 27, 2007

(54) NESTABLE SHOPPING CART

(75) Inventors: Timothy A. Otterlee, Marietta, GA (US); Rodney L. Hempen, Braselton, GA (US); Graham C. Lobban, St. Clements (CA)

(73) Assignees: Redico, Inc., Buford, GA (US); RTS Plastics, Inc., Waterloo, Ontario (CA)

( * ) Notice: Subject to any disclaimer, the term of this patent is extended or adjusted under 35 U.S.C. 154(b) by 177 days.

(21) Appl. No.: 10/788,587

(22) Filed: Feb. 27, 2004

(65) Prior Publication Data
US 2004/0164507 A1    Aug. 26, 2004

Related U.S. Application Data

(63) Continuation-in-part of application No. 10/113,310, filed on Mar. 29, 2002, now Pat. No. 6,979,004.

(51) Int. Cl.
*B62B 3/00* (2006.01)

(52) U.S. Cl. .................................. 280/33.992

(58) Field of Classification Search ........... 280/33.991, 280/33.992, 33.993, 33.995, 47.34, 47.35, 280/79.2, 79.3; D34/12, 27
See application file for complete search history.

(56) References Cited

U.S. PATENT DOCUMENTS

| | | | | |
|---|---|---|---|---|
| 3,052,319 | A * | 9/1962 | Swanson | 186/63 |
| 5,203,578 | A * | 4/1993 | Davidson et al. | 280/33.991 |
| 5,289,936 | A * | 3/1994 | Jones et al. | 220/4.28 |
| 5,435,582 | A * | 7/1995 | Davidson | 280/33.992 |
| 5,704,527 | A * | 1/1998 | Struzer | 224/547 |
| 6,270,093 | B1 * | 8/2001 | Johnson et al. | 280/33.993 |
| 6,513,817 | B2 * | 2/2003 | McCue et al. | 280/79.2 |
| 6,644,674 | B2 * | 11/2003 | Simard | 280/33.991 |

* cited by examiner

*Primary Examiner*—Frank Vanaman
(74) *Attorney, Agent, or Firm*—Womble Carlyle Sandridge & Rice, PLLC

(57) ABSTRACT

A nestable shopping cart formed to at least partially receive a second nestable shopping cart. The nestable shopping cart includes a frame, a plurality of wheels coupled to the frame, and a basket coupled to the frame. A body is coupled to the frame and a seat is coupled to the body to at least partially define a seat portion and a nest space. The nest space is positioned to receive at least a portion of the second nestable shopping cart.

8 Claims, 12 Drawing Sheets

NESTABLE SHOPPING CART

RELATED APPLICATION DATA

This is a continuation-in-part patent application of U.S. patent application Ser. No. 10/113,310 filed on Mar. 29, 2002, now U.S. Pat. No. 6,979,004 which is incorporated herein by reference.

BACKGROUND

The present invention relates to shopping carts, and particularly to formed or molded shopping carts having seats for children. More particularly, the present invention relates to formed or molded shopping carts that are nestable.

Shopping carts are commonly used in retail and wholesale stores including but not limited to grocery stores, supermarkets, hardware stores, department stores, discount stores, home improvement stores, hardware stores, and the like.

Many of these stores employ wire mesh or plastic mesh shopping carts that provide a space for the goods being purchased. Some of these carts include a fold out or attached child seat. However, for the child, the seat is often uncomfortable and the cart provides little of interest to the child. As such, children often become discontent and the shopper is rushed through the store.

A molded shopping cart may provide some entertainment for a child and may provide a more comfortable seat. However molded shopping carts tend to require additional storage space as compared to previous wire or plastic mesh carts.

SUMMARY

The present invention generally provides a nestable shopping cart formed to at least partially receive a second nestable shopping cart. The nestable shopping cart includes a frame, a plurality of wheels coupled to the frame, and a basket coupled to the frame. A body is coupled to the frame and a seat is coupled to the body to at least partially define a seat portion and a nest space. The nest space is positioned to receive at least a portion of the second nestable shopping cart.

In another embodiment, the present invention generally provides a nestable shopping cart formed to at least partially receive a second nestable shopping cart. The nestable shopping cart includes a frame, a plurality of wheels coupled to the frame, and a first basket coupled to the frame. A second basket is coupled to the frame and is disposed substantially above the first basket. A body is coupled to the frame. The body covers at least a portion of at least one of the first basket and the second basket. A seat portion is coupled to the body to at least partially define a cart passenger seat and a nest space. The nest space is adapted to receive at least a portion of the second cart.

In yet another embodiment, the present invention generally provides a nestable shopping cart arranged to receive at least a portion of a second nestable shopping cart. The nestable shopping cart includes a frame, a plurality of wheels coupled to the frame, and a first basket coupled to the frame. A second basket is coupled to the frame and is disposed substantially above the first basket. A plastic body is coupled to the frame. The plastic body covers at least a portion of at least one of the first basket and the second basket. A seat portion is integrally formed as part of the plastic body to at least partially define a cart passenger seat and a nest space. The nest space is adapted to receive at least a portion of the second nestable shopping cart.

Additional features and advantages will become apparent to those skilled in the art upon consideration of the following detailed description of preferred embodiments exemplifying the best mode of carrying out the invention as presently perceived.

BRIEF DESCRIPTION OF THE DRAWINGS

The detailed description particularly refers to the accompanying figures in which.

DETAILED DESCRIPTION OF THE DRAWINGS

Figure 1:
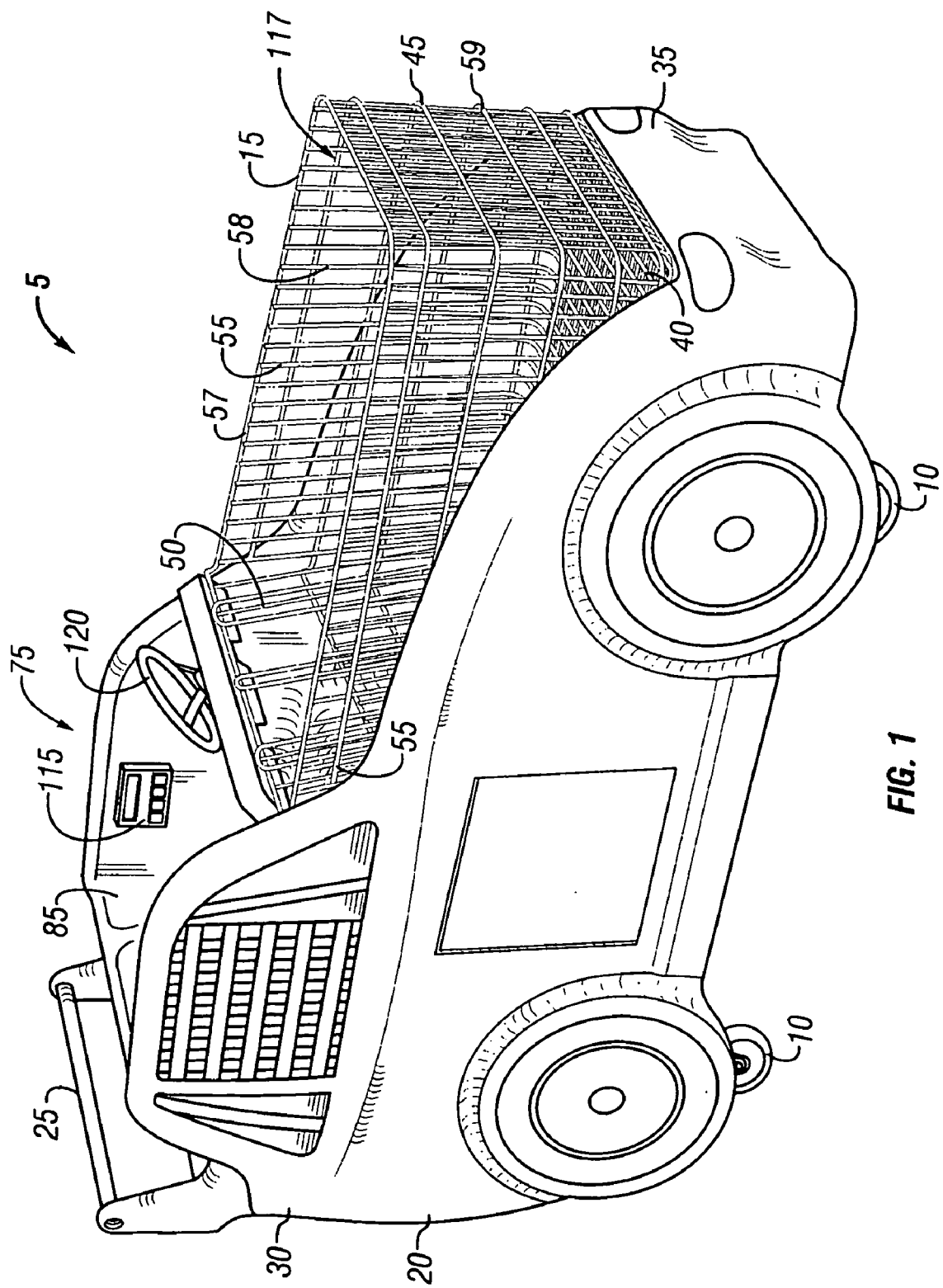
FIG. 1 is a perspective view of a cart in accordance with the invention having an electronic device.
Figure 4:
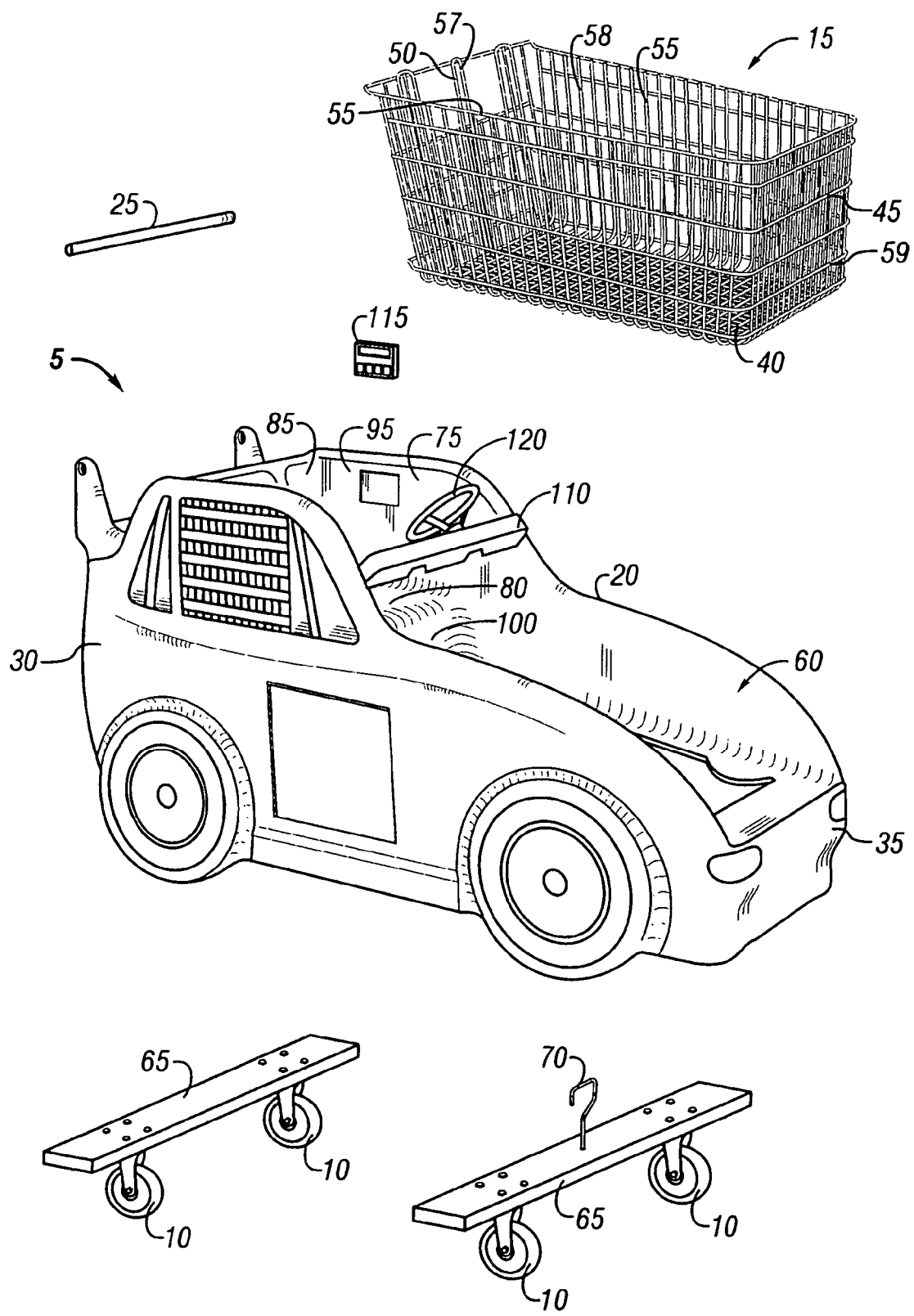
FIG. 4 is an exploded view of the cart of FIG. 1.

FIGS. 1 and 4 illustrate a shopping cart 5 in accordance with the invention, the cart 5 includes a plurality of wheels 10, a basket 15, a body 20, and a push bar 25. The wheels 10, or castors, engage the body 20 and support the cart 5 on the ground. The push bar 25 engages a rear portion 30 of the body 20 providing a convenient surface to push and steer the cart 5. The basket 15 is supported and partially surrounded by the body 20.

The embodiment illustrated in FIGS. 1 and 4 uses four wheels 10 located near the extreme corners of the body 20 to support the cart 5. The wheels 10 are fairly standard in the industry, and therefore not critical to the invention. The wheels 10 are placed apart from one another to ensure that the cart 5 remains stable even when loaded with merchandise and children. The embodiment of FIG. 1 employs four wheels 10, other embodiments use only three, while still others use five, six or even more wheels 10. Generally, the rear wheels 10 are aligned and fixed so that they rotate about a common axis. The front wheels 10 on the other hand are generally free to pivot allowing a front portion 35 of the cart 5 to easily maneuver through the narrow aisles commonly found in grocery stores and the like. Other embodiments use wheel arrangements in which all of the wheels 10 are pivotable allowing for a more maneuverable cart 5.

The basket 15 illustrated in FIGS. 1 and 4 has a base 40, a front wall 45, a rear wall 50, and two sidewalls 55. A plurality of lateral and transverse wires 57 cross one another to define each wall 45, 50, 55 and the base 40. The wires 57 firmly connect to one another using known attachment processes (e.g., welding, soldering, brazing, adhesives, mechanical fasteners, and the like). The wires 57 are preferably, steel or aluminum, but, other embodiments can use other materials (e.g., magnesium, titanium or other metals, composites, or plastics). Generally, the wires 57 are painted or coated with a material to prevent injury and to protect the wires 57 from damage. In one embodiment, the four walls 45, 50, 55, and base 40 are made together as a single component. A plurality of U-shaped wires 58 are arranged laterally and transversely to completely define the base 40 and to define the vertical wires of the walls 45, 50, 55. A plurality of ring-shaped wires 59 intertwine with the U-shaped wires 58 to complete the basket 15. The wires 58, 59 are attached to one another or to a basket frame to complete the one-piece basket 15. Other embodiments employ multiple pieces to complete a basket 15. For example, an embodiment that requires a pivotable rear wall 50 would require the rear wall 50 be made separately from the remainder of the basket 15. It is thus contemplated that the basket 15 can be assembled from any number of individual components. It should also be noted that while a wire mesh basket 15 is shown and discussed herein, the invention will function equally well with a solid basket or a basket 15 formed from sheets of plastic rather than wires 57. For example, multiple sheets of plastic formed in any common manner can be attached to one another at adjacent edges to define a basket 15. In this example each wall 45, 50, 55 along with the base 40 would be separate components attached to one another to complete the basket 15.

The basket 15 fits within an opening 60 defined by the body 20. The front portion 35 of the body 20 is shaped to accept the basket 15 therein while providing support to the basket 15. Once installed, the basket 15 is fixedly attached to the body 20. FIG. 4 illustrates one possible attachment mechanism. In FIG. 4 a brace 65 extends across the bottom of the body 20 to partially support the front wheels 10. A hook-shaped bolt 70 engages the wires 57 of the base 40 of the basket 15 and extends through a hole in the brace 65. A nut (not shown) threads onto the end of the hook-shaped bolt 70 fixedly attaching the basket 15 to the body 20. In another embodiment (not shown), bolts and washers extend through the wires 57 of the base 40 of the basket 15. The washers engage the basket 15 while the bolts engage the body 20 firmly clamping the basket 15 to the body 20. In still another embodiment, the basket 15 simply sits in the basket opening 60 provided by the body 20. In this embodiment, the basket 15 can be removed easily to facilitate storage, nesting of the carts, or delivery of groceries or other products to a vehicle or home.

Figure 3:
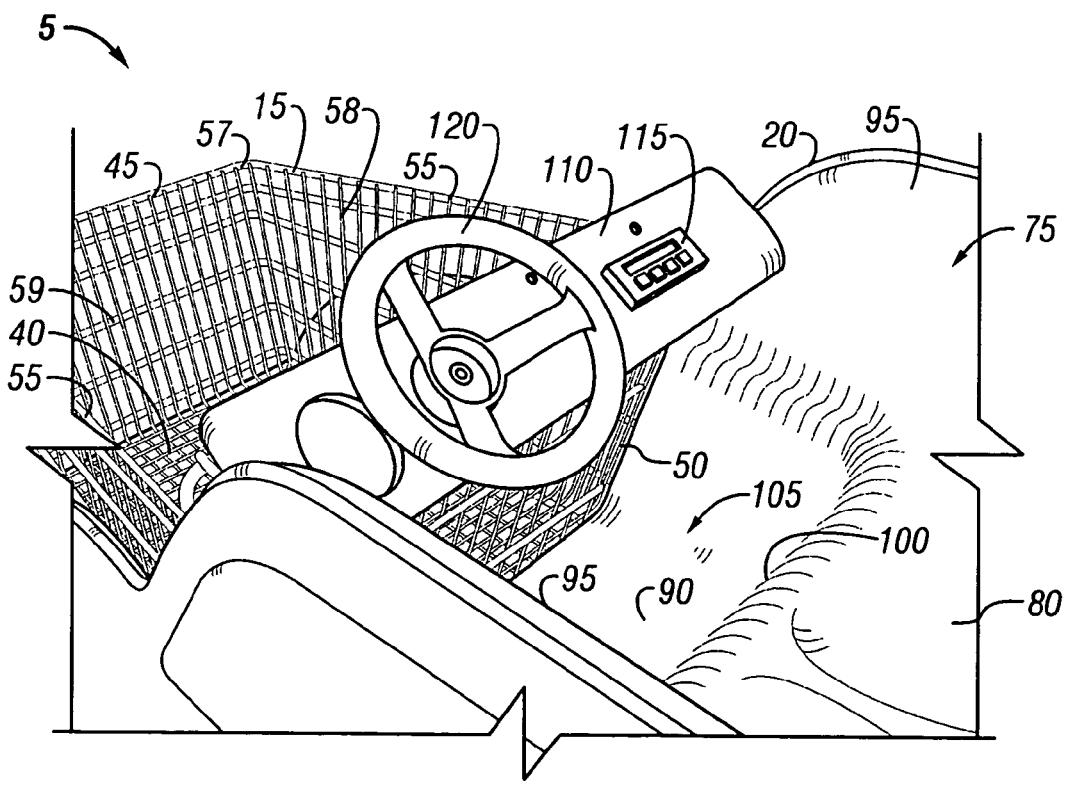
FIG. 3 is a perspective view of the seat portion of the cart of FIG. 1, showing another location for the electronic device.

The body 20 defines the front portion 35, a seat portion 75, and the rear portion 30. The front portion 35 defines the basket opening 60 in which the basket 15 sits when the components are assembled. The seat region 75, illustrated in FIGS. 1 and 3, is disposed above and behind the front portion 35 and further includes a seat 80, a back wall 85, a floor 90, and two sidewalls 95. In addition, a rear kick panel 100 extends from the floor 90 to the seat 80. The seat 80 is sized to support two small children in the seated position. The seat 80, along with the back wall 85, supports the children while the sidewalls 95 obstruct their exit from the cart 5. The children's legs extend into a chamber 105 defined by the two side walls 95, the rear wall 50 of the basket 15, and the rear kick panel 100. The chamber 105 thus completely surrounds the child's legs further enhancing the safety of the cart 5.

Referring to FIG. 3, the seat portion 75 further includes a panel 110 attached to the basket 15 or in some embodiments to the body 20. To further contain the child and to provide for entertainment, the panel 110 is disposed such that it would be immediately in front of a child seated in the seat 80. Electronic devices 115, which will be discussed in more detail below, can be attached to or disposed in the front panel 110 to entertain the child. In addition, some embodiments employ seat belts (not shown) that allow the shopper to strap the child to the seat 80 if desired.

Many processes and materials are available to manufacture the body 20, but the preferred technique involves the use of a rotomolded plastic. Rotomolding allows the body 20 to be manufactured as a substantially rigid single piece rather than multiple pieces, eliminating weaknesses and reducing cost. Other embodiments use processes such as injection molding and hot forming. In addition, while it is important to manufacture a lightweight body, other embodiments use materials other than plastic. For example, fiberglass or other composites are light and provide sufficient strength and durability and therefore would be suitable material substitutes. While it is preferable that the body 20 be made in a single operation, other embodiments employ several sections manufactured separately and then assembled to one another to complete the body 20.

FIG. 1 illustrates an assembled shopping cart 5 in accordance with the invention. The body 20 covers a portion of the sides 55 of the basket 15 but leaves the front 45 and the top 117 open. In another embodiment, the body 20 extends around the basket 15 substantially covering all the walls 45, 50, 55 leaving only the top 117 fully exposed.

To further entertain children seated in the seat portion 75 of the cart 5, some embodiments of the invention provide one or more steering wheels 120 attached to the panel 110 to allow the child to play during the shopping experience. In addition, other embodiments include one or more electronic devices 115 specially suited to the child's needs. For example, one embodiment provides two headphone jacks within the cart 5. The jacks connect to a radio receiver tuned to the frequency of the store's internal broadcast or to any desired frequency. The child can thus listen to music, stories, or other entertainment provided by the store through the headphones without the sound disturbing other patrons. As one having ordinary skill in the art will realize, headphones can be used for the audio output of any device described herein. In yet another embodiment, a video display is provided in addition to the audio device previously described. The video display receives a broadcast from within the store, over the airwaves, or is coupled to a video cassette recorder, digital videodisk (DVD) player, or the like to allow the display of any entertainment desired. In still another embodiment, a computer or video game is coupled to the cart 5 in a position that allows a seated child to interact. A joystick or other interactive device can be coupled to the body 20 of the cart 5 to allow the child to interact. In addition, the steering wheels 120, described above can be interconnected with the game to provide input if desired. A person skilled in the art will realize that many commercially available technologies (e.g., flat screens, plasma screens, closed-circuit television, MP3 players, computers, and the like) can be adapted to the cart 5 or child carrier of the present invention to provide entertainment for children. Small rechargeable batteries 122 hidden within the cart 5 can power many, if not all, of these technologies.

Figure 2:
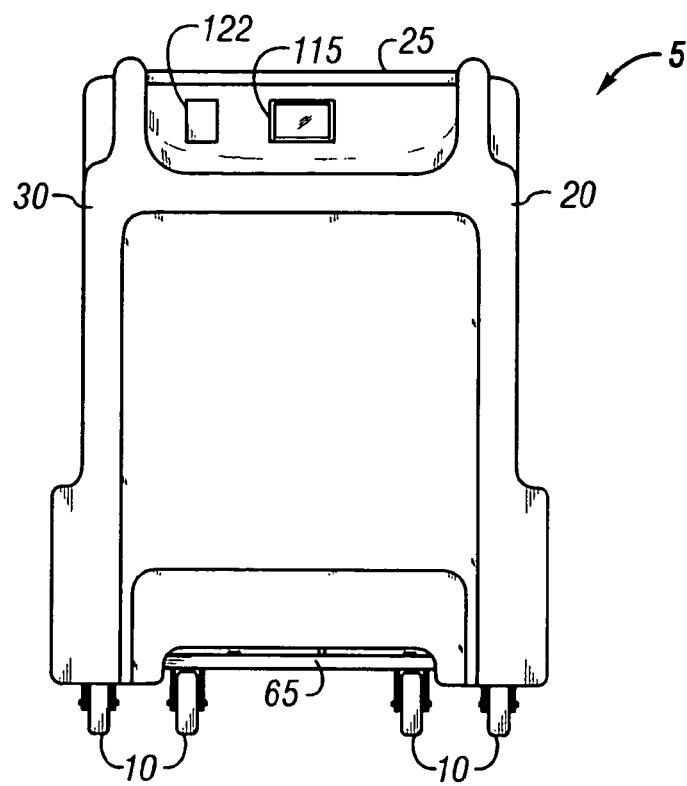
FIG. 2 is a rear view of the cart of FIG. 1, showing another location for the electronic device.

In addition to the above-described devices, another embodiment of the cart 5, shown in FIG. 2, employs a small computer (e.g., PDA, calculator, micro-computer, etc.) powered by a rechargeable battery 122. The computer is supported by the cart 5 in a position that allows the shopper to easily view the display. The computer can be used as a calculator to aid the shopper, or can be programmed with locations of various products within the store, or shopping center, to aid the shopper in locating desired products. In another embodiment (not shown), the computer is coupled to a portable bar code reader allowing the shopper to scan products as they are placed in the cart 5. This greatly aids the shopper in maintaining a budget, and allows a shopper to review items placed in the cart 5 on the computer screen rather than having to search through the various products within the basket 15.

Figure 7:
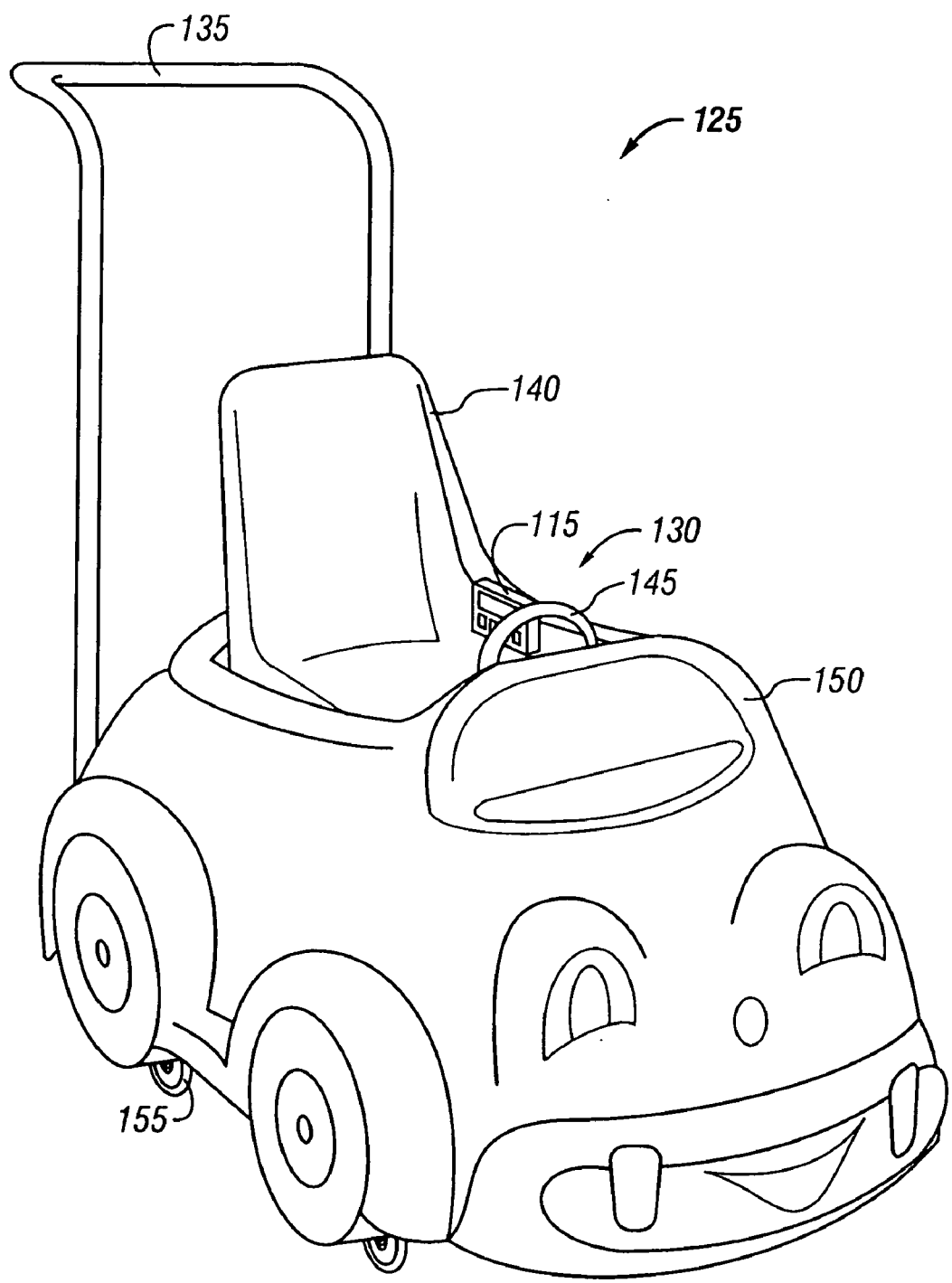
FIG. 7 is a perspective view of another child carrier in accordance with the invention, having an electronic device.
Figure 8:
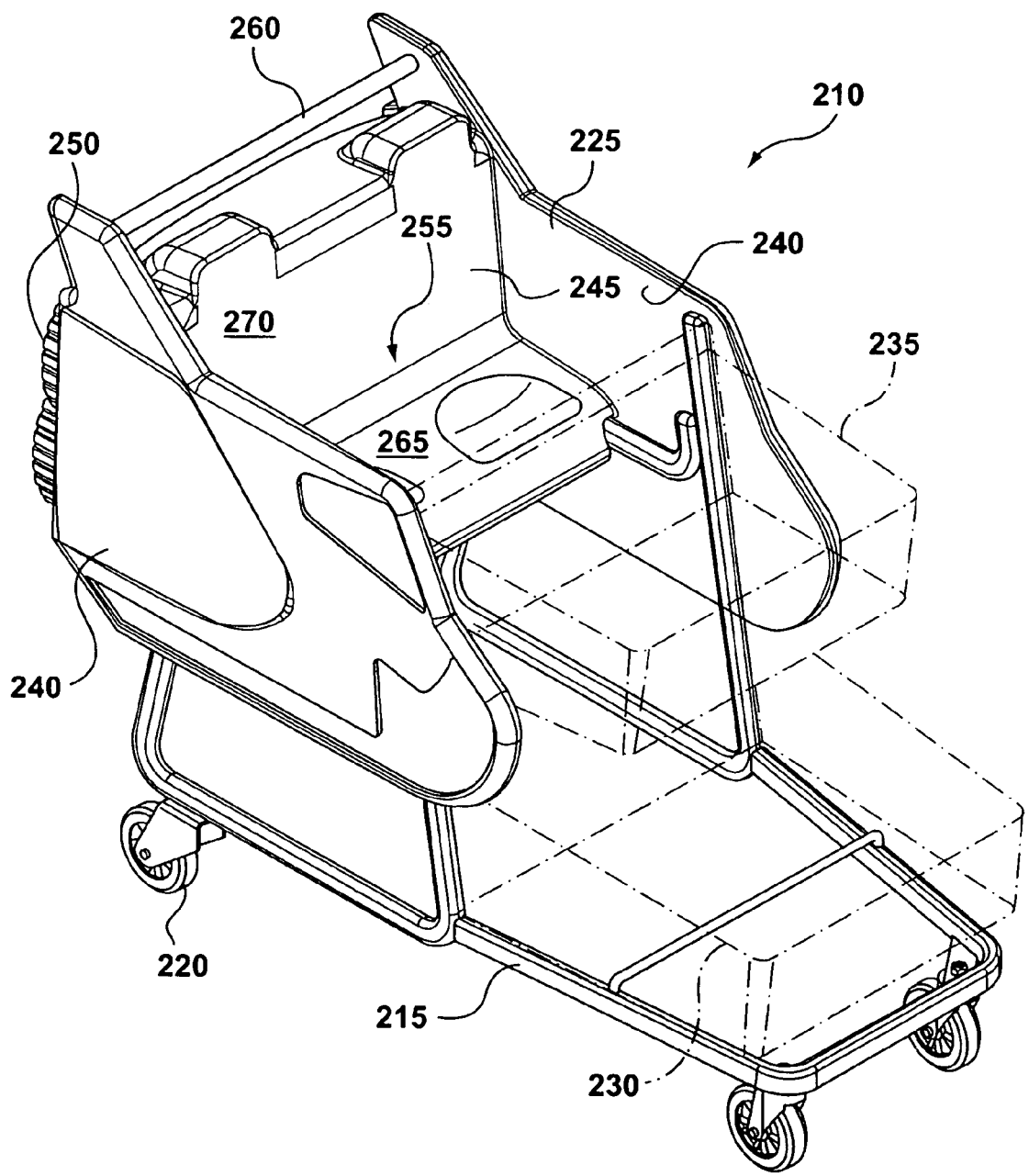
FIG. 8 is a perspective view of another embodiment of a shopping cart.

FIG. 7 shows another embodiment of the invention in which an electronic device 115 is provided in a child carrier 125 suitable for carrying children in a retail or other shopping environment. The child carrier 125 does not have a basket like the carts 5 of the previous embodiments but rather performs the function of carrying and entertaining the child. The child carrier 125 has a seat region 130 having a push bar 135, a seat 140, and a steering wheel 145, surrounded by the body 150. The body 150 is supported by a plurality of wheels 155. The electronic device 115 is disposed within the body 150 and supported such that children seated within the child carrier 125 can easily access and interact with the electronic device 115. For example, the device 115 could be a television monitor that receives a signal from within the store. The monitor could display cartoons, stories, or educational programs that are of interest to young children. Other embodiments of the child carrier 125 include a basket (not shown) to aid the shopper. The basket could be hung from the push bar 135 or supported in some other convenient manner.

In another embodiment (not shown), the body is shaped to resemble an animal and the child carrier is used in a zoo or carnival setting. The electronic device 115 could be a radio receiver able to pick up a broadcast emanating from within the zoo. Further, the radio receiver could receive a different signal based on its location allowing, the audio to describe the particular animals in the area.

As a person having ordinary skill in the art will realize, many electronic devices can be adapted to operate within a child carrier 125 or cart 5 as described herein. In addition, a person having ordinary skill in the art will realize that an electronic device as described herein can be adapted to fit within any molded body commonly used in child carriers. In addition, child carriers that use tubular frames may employ electronic devices disposed within a formed panel or piece that attaches to the child carrier. Thus, the present invention should not be limited to only those embodiments described herein.

Figure 5:
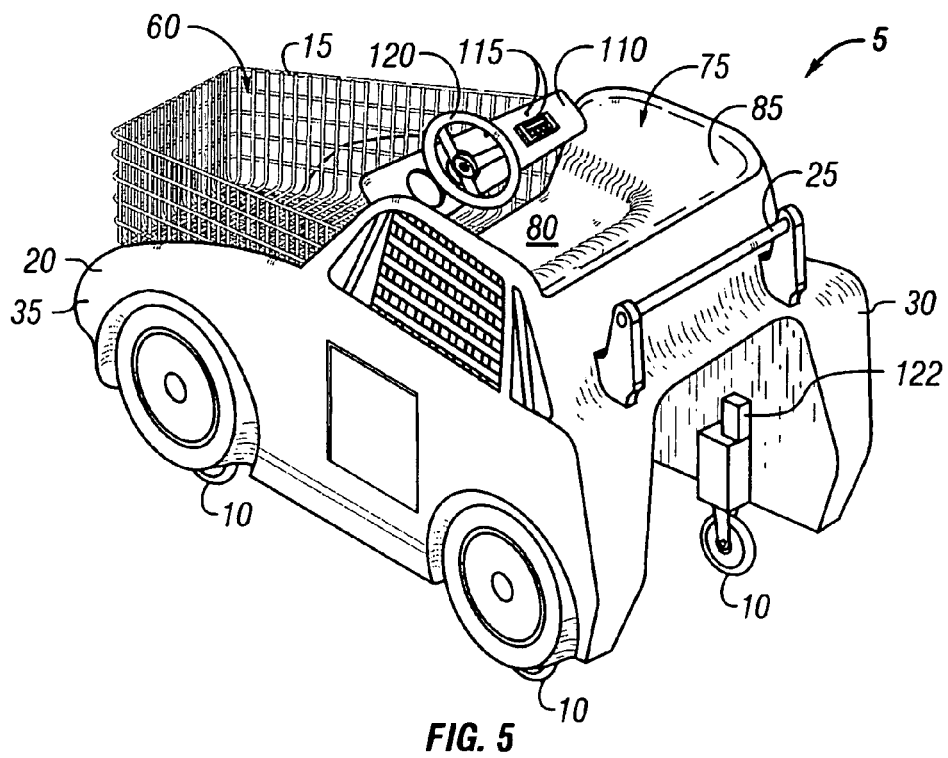
FIG. 5 is a perspective view of the cart of FIG. 1 having an open rear portion.
Figure 6:
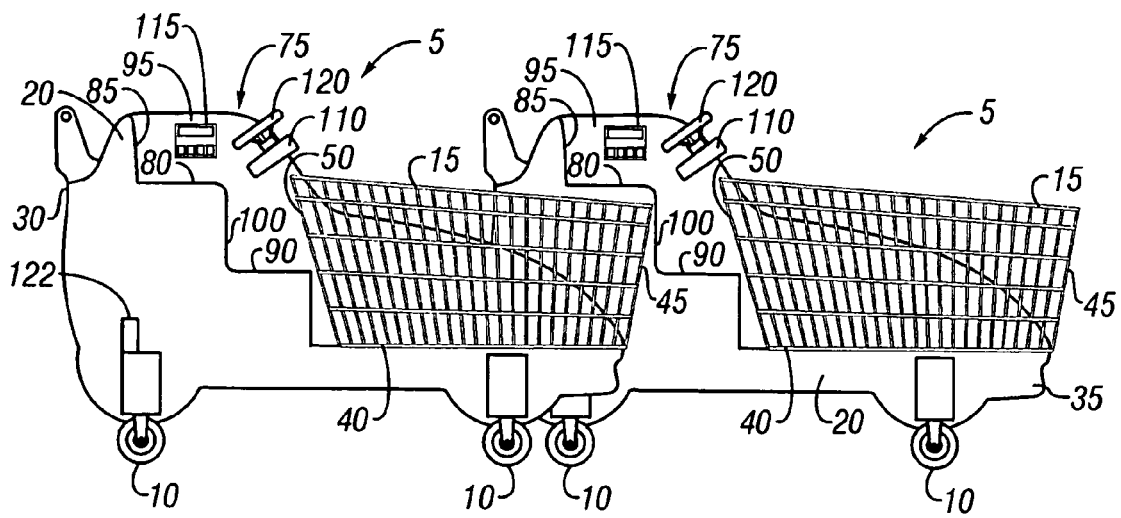
FIG. 6 is a section view of two nested carts in accordance with the present invention.

With reference to FIG. 6, one construction of the shopping cart 5 is illustrated in a nested position within a second similar shopping cart 5a. The ability to nest the shopping carts 5, 5a reduces the storage space required for the individual shopping carts 5. In this construction, the rear portion of the cart body 20 is open (shown in FIG. 5) to receive a portion of the basket 15a and the body 20a of the second cart 5a.

Turning to FIGS. 8-14, another construction of a shopping cart 210 is illustrated. The shopping cart 210 includes a frame 215, a plurality of wheels 220 coupled to and supporting the frame 215, a body 225 coupled to the frame 215, a first or lowermost basket 230, and a second or uppermost basket 235. The first and second baskets 230, 235 are coupled to the frame 215 and are shown in phantom in FIGS. 8 and 12-14 for clarity.

Figure 9:
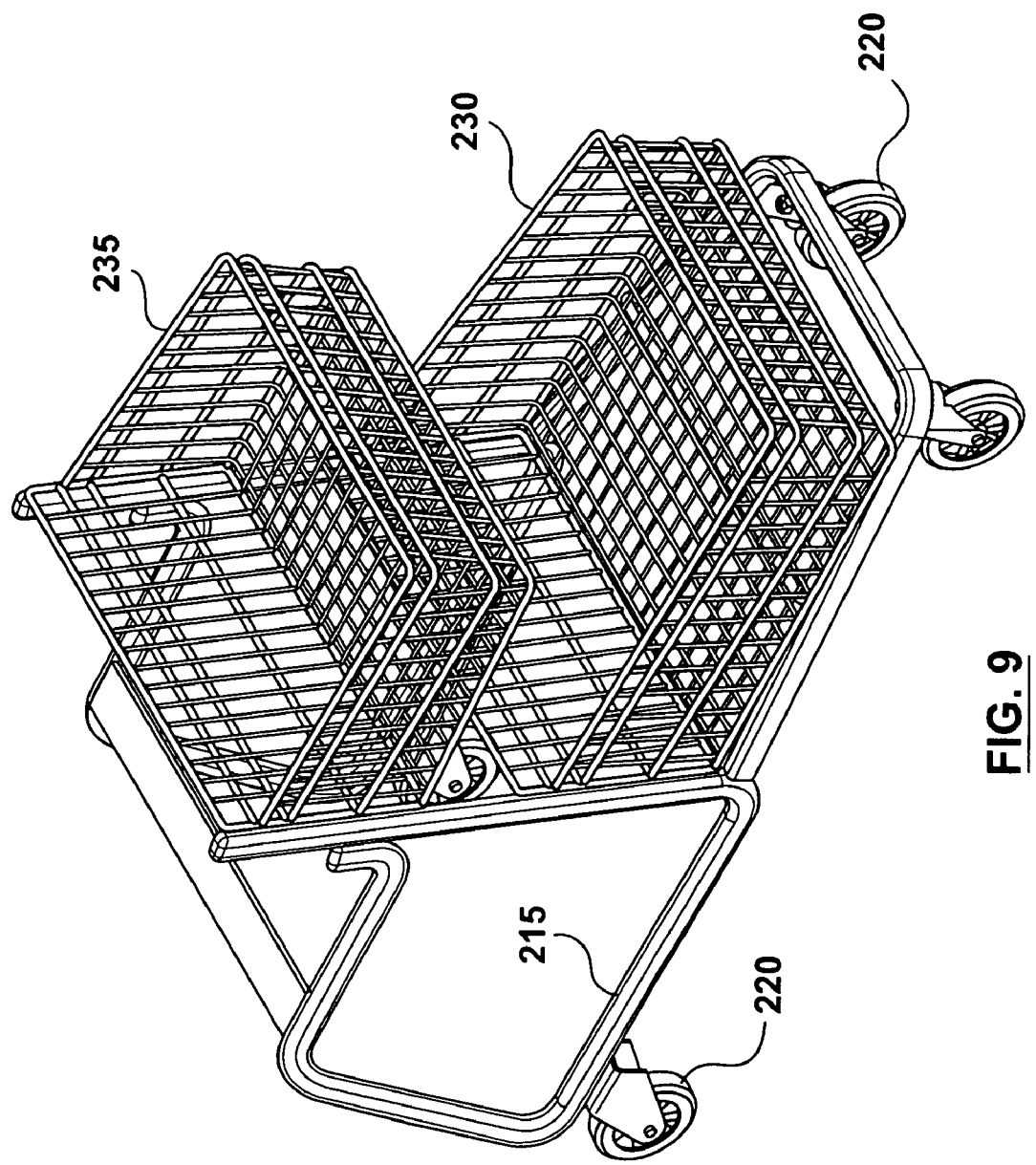
FIG. 9 is a perspective view of a frame and basket arrangement of the shopping cart of FIG. 8.

The frame 215, illustrated in FIG. 9, is at least partially formed using metallic tubes, with other materials also being suitable (e.g., composites, plastics, and the like). In some constructions, steel or aluminum is used, with other metals also functioning well. In general, round tube is used. However, square, rectangular, or other tube can also be used if desired. In addition, other forms of material in addition to tubes (e.g., channel, I-beam, angle beams, and the like) can also be used to assemble the frame 215. The tubes are bent or otherwise formed to the desired shapes and attached to one another using any suitable process (e.g., welding, fasteners, and the like).

The wheels 220, or castors, attach to the frame 215 and provide support for the shopping cart 210. The wheels 220 may bolt to the frame 215, or may be more permanently affixed by welding or other suitable processes. In the illustrated construction, four wheels 220 are used. However, other constructions may use more or less as required.

The first and second baskets 230, 235 may be formed from wire as previously described or may be formed from plastic or other materials using any suitable process. The baskets 230, 235 attach to and are supported by the frame 215. The baskets 230, 235 can be welded to the frame 215 or attached using fasteners or other suitable means. In another construction, hook members are attached to the frame 215 to receive the baskets 230, 235. The baskets 230, 235 are then easily removed for check-out, replacement, or storage.

Figure 10:
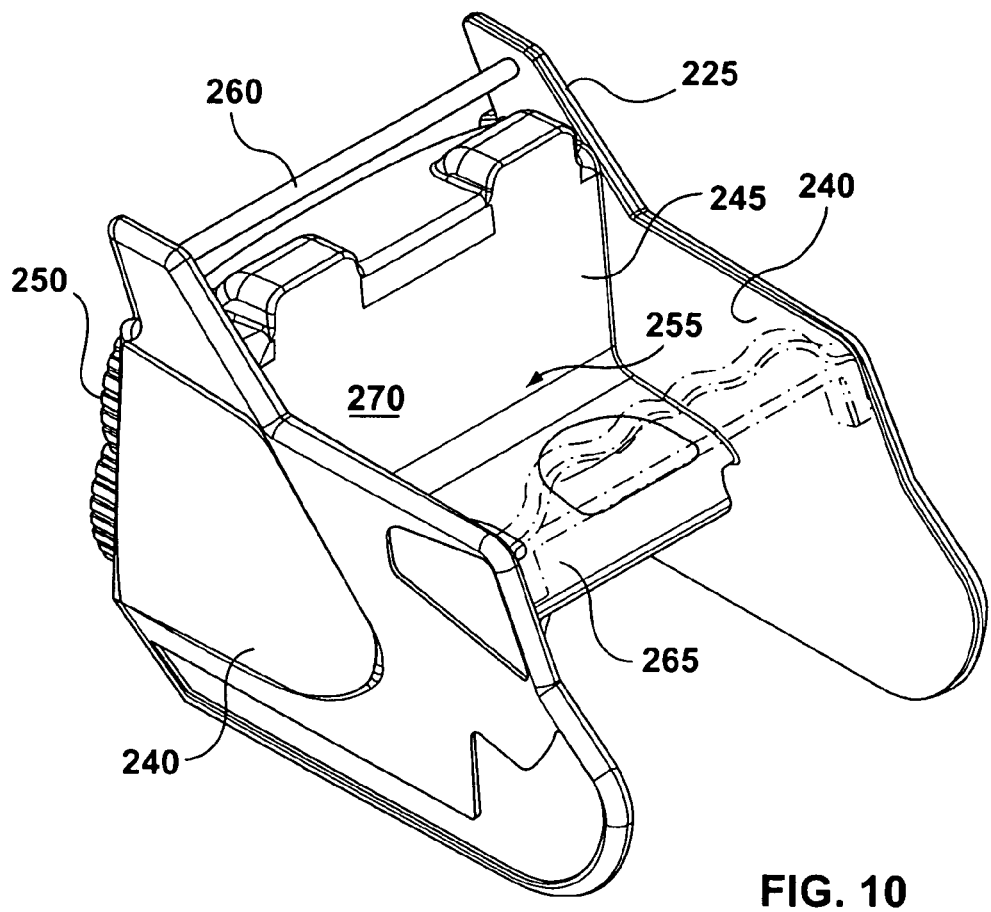
FIG. 10 is a perspective view of a cart body of the shopping cart of FIG. 8.

The body 225, illustrated in FIG. 10, includes two side panel portions 240, a seat portion 245, and a rear panel 250. The body 225 is formed to attach to the frame 215 using any suitable means (e.g., fasteners). The seat portion 245 may attach to the body 225 or may be integrally formed with the body 225. In preferred constructions, the body 225 and the seat portion 245 are integrally formed from a plastic material using a rotomolding process. Of course, other processes as well as other materials could be used to manufacture the seat portion 245 as well as the body 225. The body 225 may also include a panel (not shown) that attaches to, or is formed as part of, the body 225. The panel would be disposed in front of the seat portion 245 and could support entertainment devices such as a steering wheel or an electronic device and the like.

The seat portion 245 and the side panels 240 cooperate to at least partially enclose a passenger seat area 255. The passenger seat area 255 is disposed behind the first basket 230 and the second basket 235 adjacent a push bar 260. In this position, the children in the seats are within reach of the shopper pushing the cart 210. The seat portion 245 includes a substantially horizontal panel 265 and a substantially vertical panel 270 that are substantially solid (i.e., there are few or no apertures that would allow one to see through the panel). The horizontal panel 265 provides a seat for the passengers to sit on, while the vertical portion 270 defines a back support for the passengers.

The side panels 240 are contoured and decorated to resemble a vehicle or other object that may be of interest to a child. In the illustrated embodiment, the panels 240 are shaped to resemble an aircraft. The panels 240 are substantially solid (i.e., there are few or no apertures that would allow one to see through the panel) and cover a portion of the sides of at least one of the baskets 230, 235 when the cart 210 is assembled.

Figure 11:
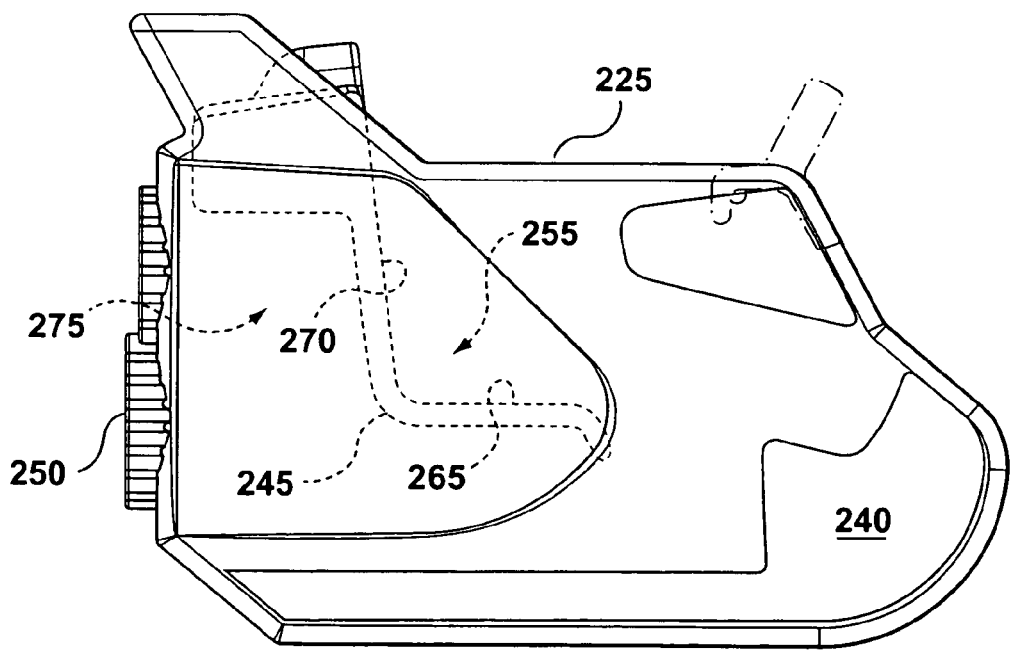
FIG. 11 is a side view of the body of FIG. 10.
Figure 15:
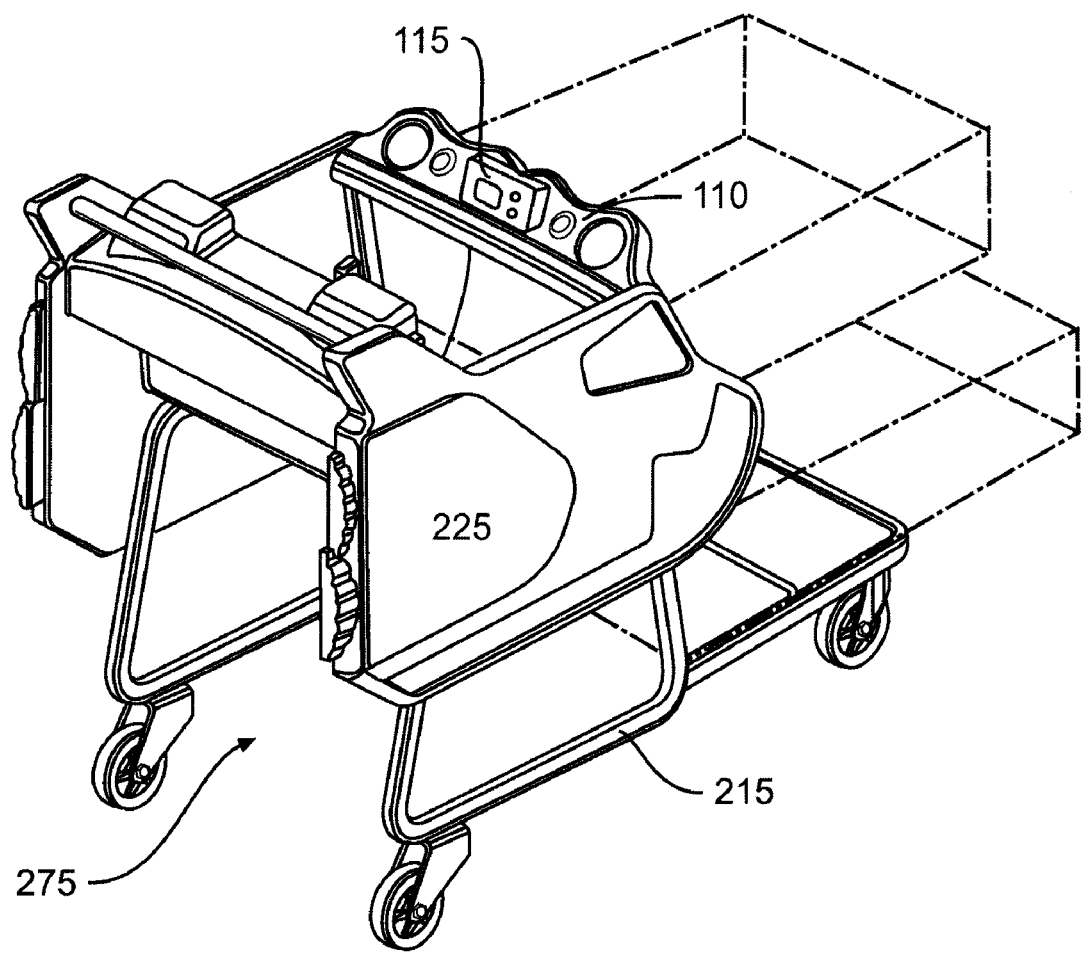
FIG. 15 is a rear perspective view of the nestable shopping cart.

As shown in FIG. 11, the seat portion 245 and the body 225 at least partially define a nesting space 275 (shown in FIGS. 13 and 15) beneath the seat portion 245 and between the side panels 240. The nesting space 275 provides space for a portion of a second shopping cart 210a when the carts 210, 210a are nested. The rear panel 250 includes an opening or is formed to receive the portion of the second shopping cart 210a that fits within the nesting space 275.

Figure 12:
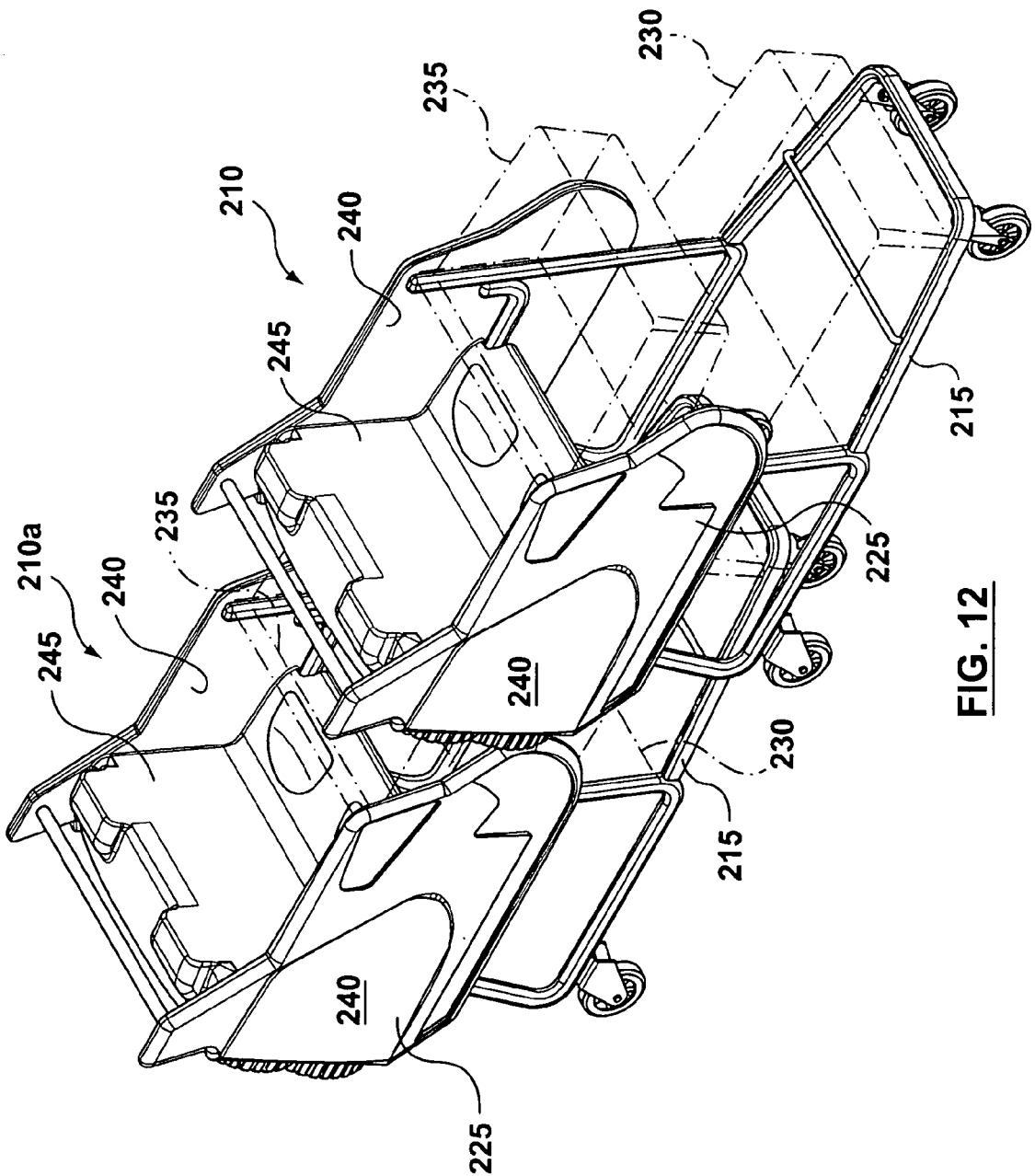
FIG. 12 is a perspective view of a second shopping cart nested at least partially within the shopping cart of FIG. 8.
Figure 13:
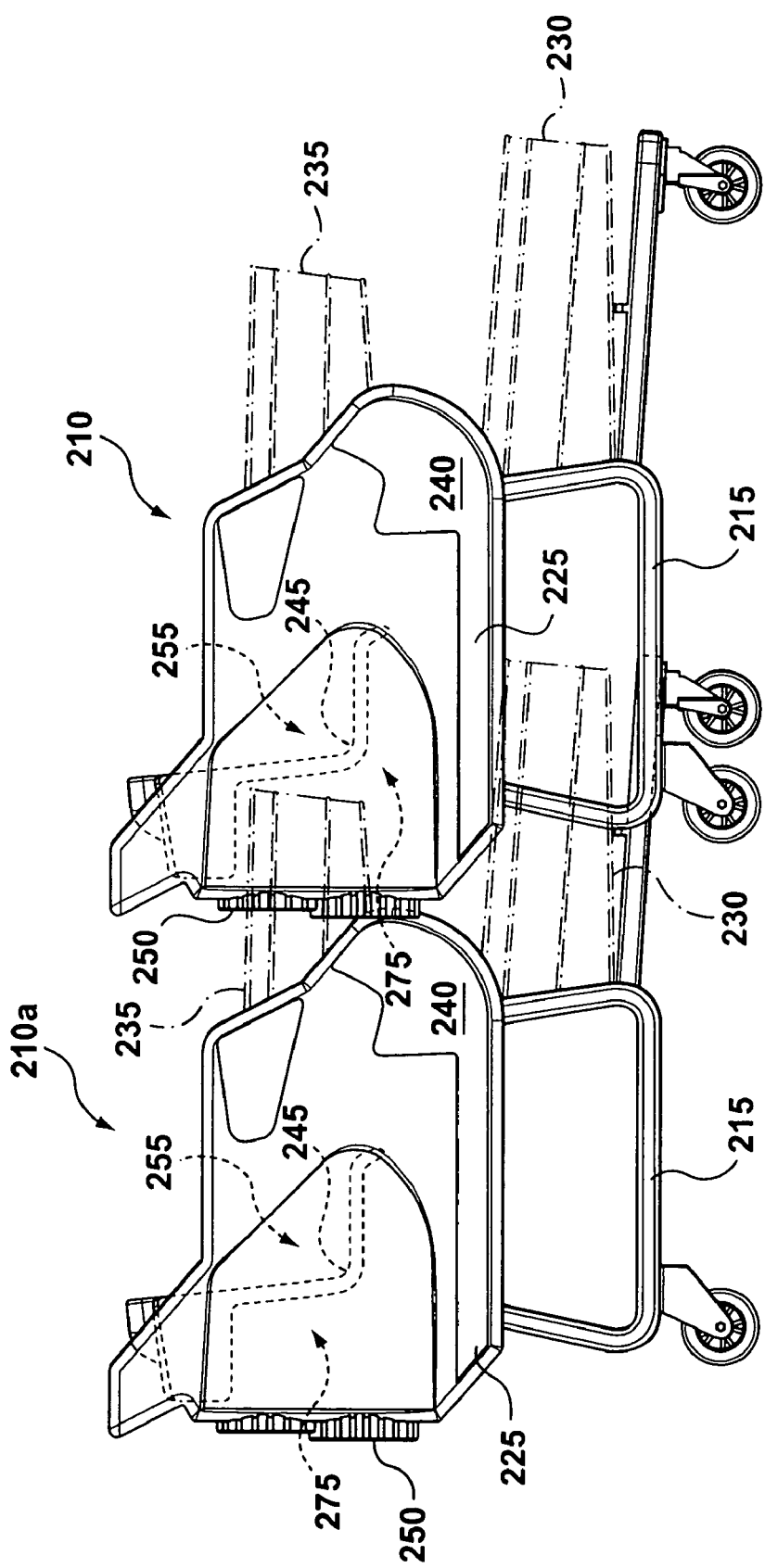
FIG. 13 is a side view of the nested arrangement of FIG. 12.
Figure 14:
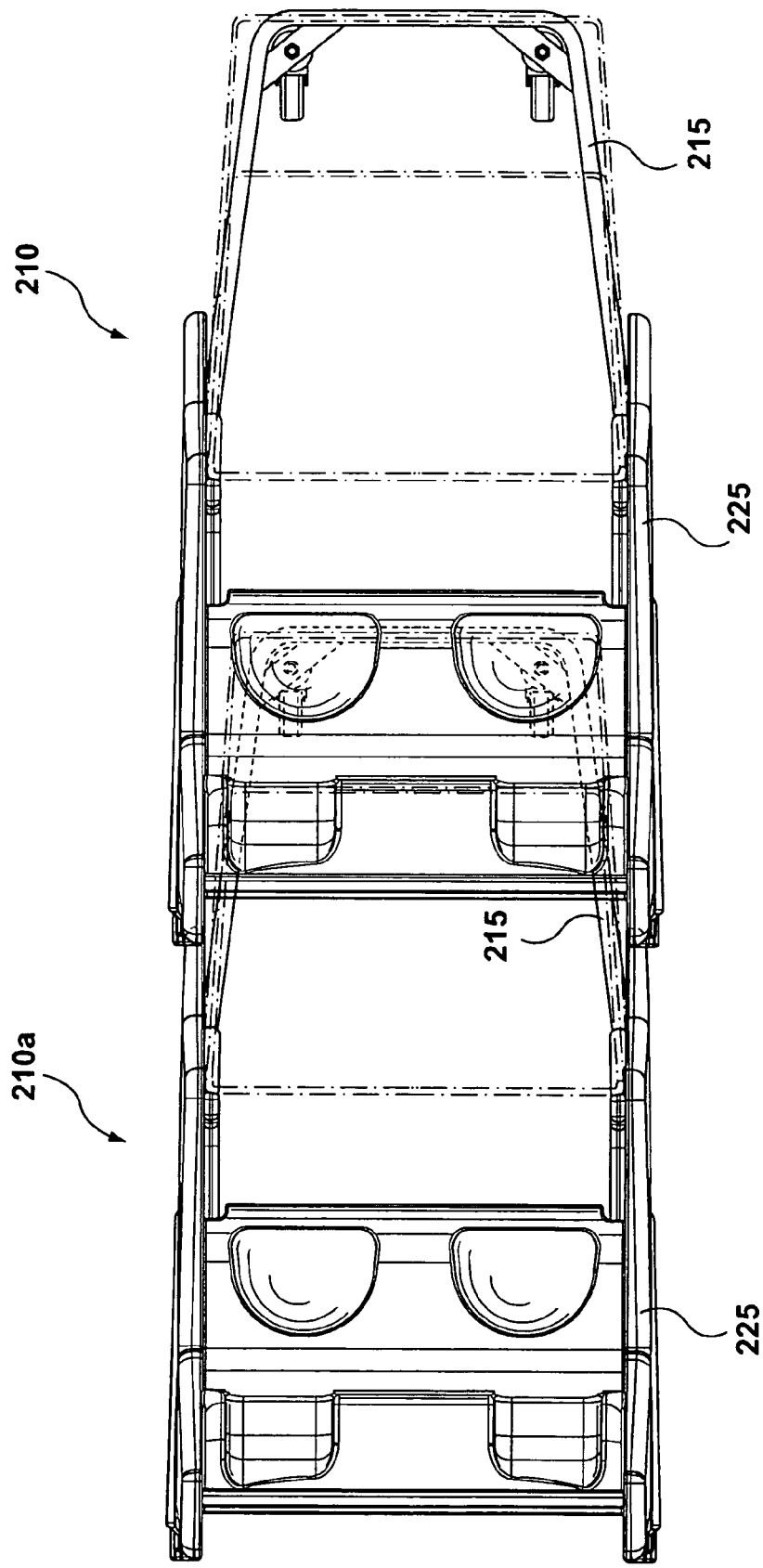
FIG. 14 is a top view of the nested arrangement of FIG. 12.

FIGS. 12-14 illustrate two shopping carts 210, 210a in the nested position. As can be seen, portions of the first basket 230 and the second basket 235 are able to fit within the nesting space 275. To facilitate this arrangement, the front portion of the carts 210, 210a (the portion that fits within the nesting space 275) is tapered slightly, as shown in FIG. 14. The taper allows the frame 215 and baskets 230, 235 of the second cart 210a to fit within the nesting space 215 of the first cart 210. Of course, other constructions may enlarge the rear portion instead of, or in addition to, tapering the front portion of the carts 210, 210a to achieve the same results.

A portion of the uppermost basket 235 fits within the nesting space 275 and abuts the back of the seat portion 245. The lowermost basket 230 fits within the nesting space 275 beneath the seat portion 245. In another construction, the uppermost basket 235 can be removed from the frame 215 and placed within the lowermost basket 230. The two baskets 230, 235 than fit beneath the seat portion 245 and a larger portion of the second cart 210a can be positioned within the nesting space 275.

Although the invention has been described in detail with reference to certain preferred embodiments, variations and modifications exist within the scope and spirit of the invention as described and defined in the following claims.

What is claimed is:

1. A nestable shopping cart arranged to receive at least a portion of a second nestable shopping cart, the nestable shopping cart comprising:
   a frame;
   a plurality of wheels coupled to the frame;
   a first basket coupled to the frame;
   a second basket coupled to the frame and disposed substantially above the first basket;
   a plastic body coupled to the frame, the plastic body covering at least a portion of at least one of the first basket and the second basket;
   a panel mounted between the body and the second basket;
   an electronic device positioned along the panel; and
   a seat portion integrally formed as part of the plastic body to at least partially define a cart passenger seat and a nest space, wherein
   the nest space is adapted to receive at least a portion of the second nestable shopping cart, and
   the cart passenger seat faces the second basket.

2. The nestable shopping cart of claim 1, wherein the body and the seat are integrally formed as a single piece using a rotomolding process and a plastic material.

3. The nestable shopping cart of claim 1, wherein the nest space receives at least a portion of a basket of the second nestable shopping cart.

4. The nestable shopping cart of claim 1, wherein the nest space receives at least a portion of a first basket and a second basket of the second nestable shopping cart.

5. The nestable shopping cart of claim 1, wherein the body and the seat portion define a plurality of substantially solid surfaces and cooperate to substantially enclose the cart passenger seat.

6. The nestable shopping cart of claim 1, wherein the electronic device comprises:
   (a) an audio device;
   (b) a video display device coupled to a video cassette recorder or a digital videodisk player;
   (c) a video display device coupled to an audio/video receiver;
   (d) an audio/video storage device coupled to an audio/video playback device; or
   (e) any combination thereof.

7. The nestable shopping cart of claim 6, wherein the audio device comprises a radio receiver, satellite radio receiver, internal broadcasting system, or any combination thereof.

8. The nestable shopping cart of claim 6, wherein the video display device comprises a flat screen, a plasma screen, a computer screen, or a television screen.

* * * * *